R. M. WAHLGREN AND E. J. R. BEATTEY.
LENS TESTING DEVICE.
APPLICATION FILED JULY 6, 1920.

1,406,118.

Patented Feb. 7, 1922.

Inventor
Roy M. Wahlgren
Earle J. R. Beattey
By Howard E. Barlow
Atty.

UNITED STATES PATENT OFFICE.

ROY M. WAHLGREN, OF OMAHA, NEBRASKA, AND EARLE J. R. BEATTEY, OF PROVIDENCE, RHODE ISLAND, ASSIGNORS TO RIGGS OPTICAL COMPANY, OF OMAHA, NEBRASKA, A CORPORATION OF NEBRASKA.

LENS-TESTING DEVICE.

1,406,118.  Specification of Letters Patent.  Patented Feb. 7, 1922.

Application filed July 6, 1920. Serial No. 394,361.

*To all whom it may concern:*

Be it known that we, ROY M. WAHLGREN, and EARLE J. R. BEATTEY, citizens of the United States, residing at Omaha and Providence, respectively, in the counties of Douglas and Providence and States of Nebraska and Rhode Island, respectively, have invented certain new and useful Improvements in Lens-Testing Devices, of which the following is a specification.

This invention relates to a lens-testing device wherein various combinations of testing lenses may be employed to determine or prove the character and strength of the lens required to correct the defective vision of a patient; and the object of this invention is to provide a lens holder which is simple and practical in construction and which is provided with means for holding a trial lens in a fixed position and which is also provided with a test-lens carrying member mounted to be rotated and support a plurality of test lenses in position to cooperate with the lens to be tested to determine the true value of the single lens which is to be given the patient and to prove that this lens equals that produced by the combination of the testing lenses.

The nature and advantages of the invention will be better understood when the following detail description is taken in connection with the accompanying drawings, the invention residing in the combination and arrangement of parts as claimed.

In the drawings forming part of this specification, like numerals of reference indicate similar parts in the several views and wherein:—

Figure 1:
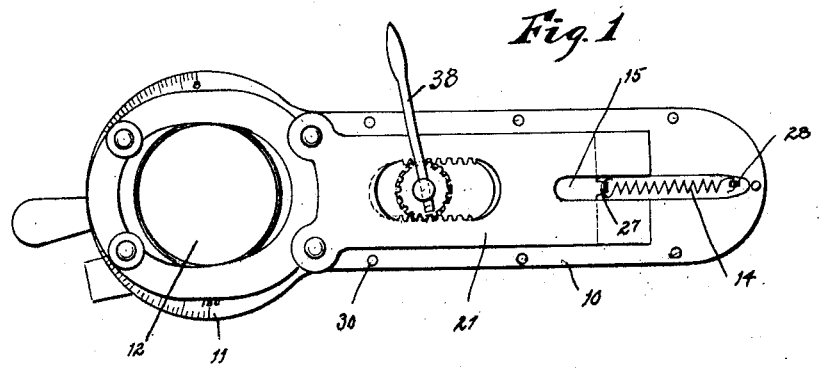
Figure 1 is a top view of our inmproved lens-testing device with a portion of the frame removed, to better illustrate the action of the parts.

It is found in practice desirable to provide a lens-testing device in which the conditions of refraction in a lens may be reproduced similar to those obtained in conjunction with the human eye so as to be able to prove the exact focalizing power of the lens being tested. To do this it is found necessary to hold the trial lens in a given position and to be able to position any desired number of test lenses and to so mount these testing lenses that they may be rotated by hand relative to each other and also to provide means whereby they may be rotated in unison when desired, in order to accurately determine the value of the trial lens.

The following is a detailed description of one means in which the above result may be accomplished; in which 10 designates the frame member of the device which has an elongated body portion serving as a convenient supporting handle, at one end of which is a circular enlargement at 11 provided with a central opening 12.

This handle portion is provided with a longitudinal groove or recess 13 at its outer end, in which an operating spring 14 presently described, may set.

Mounted upon this frame is a sliding plate 15 also having an enlargement 16 at one end through which is somewhat of an elongated opening 17 adapted to register with the opening 12 through the main frame. At the outer end of this plate are positioned two upstanding lens-engaging pins 18, and in the body portion of this plate is another opening 19, one edge of which is provided with rack teeth 20.

Mounted to slide upon this plate 15 is another plate 21 which is also provided at one end with a pair of upstanding lens-engaging pins 22 adapted to cooperate with the pins 18 on the plate 15 to hold a lens. This plate 21 is also provided with rack teeth 23 formed in the opening 24 on the edge opposite to that of teeth 20 in the opening 19 in the plate 15.

In order to provide means whereby these two plates 15 and 21 may operate in unison but in opposite directions, we have mounted a gear 25 in position to engage the opposite teeth on both of said plates, said gear being fixed on the pin 26 which is provided with an operating handle 38 whereby it may be rotated by hand when desired to move the said plates toward or from each other. The spring 14 has one end connected to the hook 27 on one end of the plate 15 while its opposite end is connected to the hook 28 in the frame 10, whereby its tension serves to normally draw the two plates 15 and 21 and their lens-engaging pins toward each other and firmly support the trial lens between them.

In order to retain these oppositely sliding plates in position, we have provided a top plate or cover 29 which is secured to the base plate or frame 10 by means of screws 30 along its edge. This top plate also serves as an upper bearing for the gear pin 26, the lower bearing of which pin being in the bottom frame plate 10.

Figure 2:
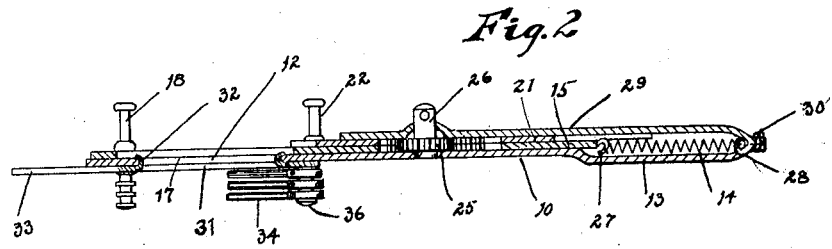
Figure 2 is a central sectional elevation of the device.
Figure 3:
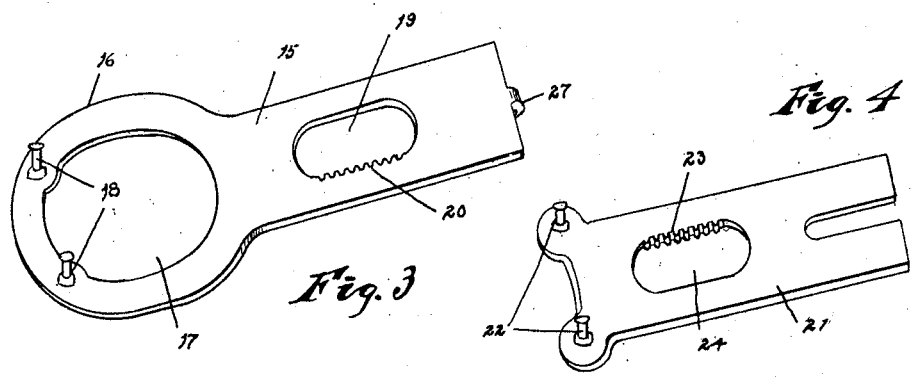
Figure 3 is a perspective view of one of the slidable plates having lens-gripping posts.
Figure 4:
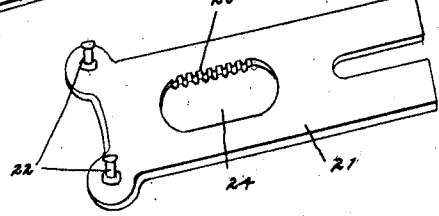
Figure 4 is a perspective view showing another of the oppositely-slidable plates also having lens-gripping posts which are adapted to cooperate with those of the plate shown in Figure 3, to hold the lens.
Figure 5:
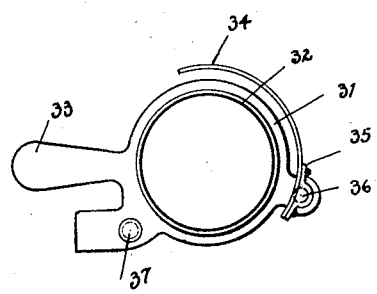
Figure 5 is a top view of the rotatable member which is mounted to rotate about the opening through the main frame and which is provided with means for retaining a plurality of test lenses.
Figure 6:
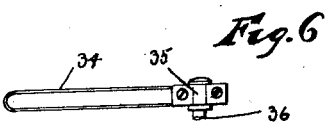
Figure 6 is an enlarged perspective view illustrating one of the spring arms adapted to engage and support one of the test-lenses.

In practice it is found necessary to provide means for holding a plurality of test-lenses which may cooperate with each other and with the trial lens to accurately determine the value of the latter, and to provide a circular member 31 having an upturned lip 32 which is adapted to extend up through the central opening 12 of the main frame and have this edge turned over that of this opening, as illustrated in Figure 2, thereby providing a bearing on which this member 31 may be readily rotated about this opening, and we have provided a handle 33 on this member, which projects out beyond the frame and may be grasped by the hand to readily manipulate the same.

In order to provide simple and effective means for holding each of the plurality of test-lenses separately and firmly in position, we have provided a plurality of curved spring grooved arms 34, each of which is firmly connected by a clamp 35 to the post 36, in each of which grooved arms a test lens may be positioned and held by spring pressure against the post 37, whereby the edges of these test-lenses may be individually engaged by the thumb and finger of the optician and rotated to bring their axes into proper alinement with each other and when so positioned then all of these test-lenses may be rotated in unison by a simple movement of the frame handle 33.

From the combined values of these test lenses the optician may compute the true value of the single lens which should be delivered to the patient.

The device is simple and practical in construction and may be easily manipulated, and by its use the accuracy of the lens to be tested may be quickly and readily determined.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. A lens-testing device comprising a frame, a pair of oppositely-slidable members mounted in said frame, each carrying means for gripping a lens between them, oppositely-disposed rack teeth on each of said members, a gear engaging said rack teeth of both members whereby a movement of said gear moves said members in opposite directions to grip or release the lens, a spring normally moving said members to grip the lens, and rotatable means for carrying a cooperating test-lens.

2. A lens-testing device comprising a frame, a pair of oppositely-slidable members mounted on said frame, each carrying means for gripping a lens between them, oppositely-disposed rack-teeth on each of said members, a gear engaging said rack teeth of both members whereby a movement of said gear moves said members in opposite directions to grip or release the lens, a spring normally moving said members to grip the lens, a test-lens carrying member mounted to be rotated about said frame-opening, and yieldable means in said test-lens carrying member for individually supporting a plurality of test-lenses whereby each may be axially adjusted independently of the others and then all may be rotated in unison when desired.

In testimony whereof we affix our signatures.

ROY M. WAHLGREN.
EARLE J. R. BEATTEY.